United States Patent Office 3,548,294
Patented Dec. 15, 1970

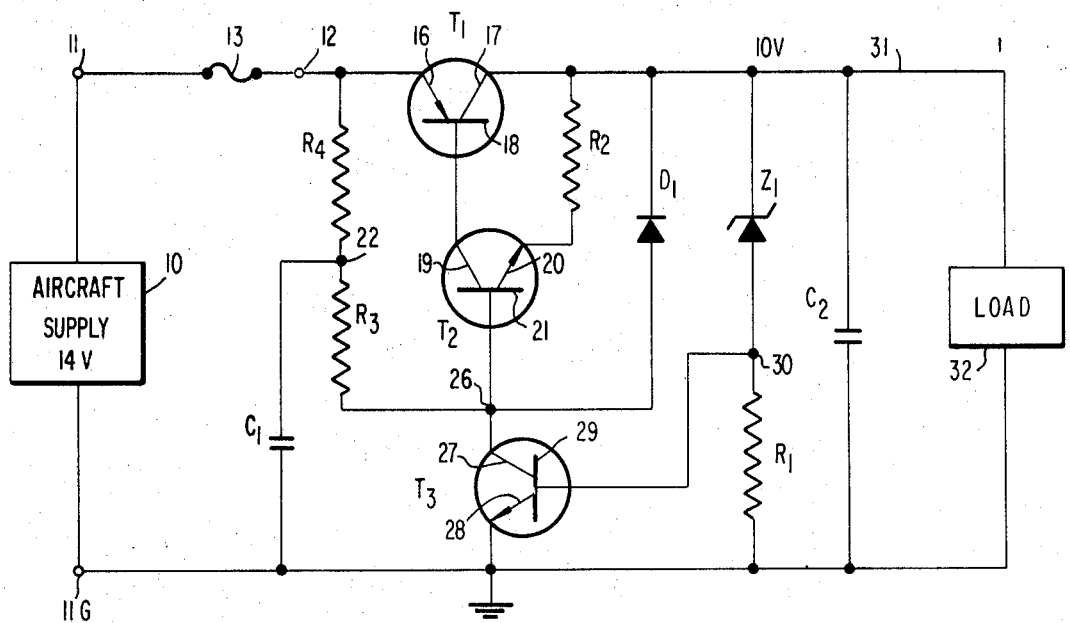
COMPONENTS
| | | |
|---|---|---|
| TRANSISTOR | $T_1$ | PNP 2N3214 |
| — | $T_2$ | NPN 2N1308 |
| — | $T_3$ | NPN MPS706 |
| ZENER DIODE | $Z_1$ | IN 7584 |
| DIODE | $D_1$ | IN 647 |
| RESISTOR | $R_1$ | 68 Ω |
| — | $R_2$ | 33 Ω |
| — | $R_3$ & $R_4$ | 330 Ω |
| CAPACITOR | $C_1$ | 220 μμf |
| — | $C_2$ | 47 |
| FUSE | | FAST ACTING .375A |
INVENTOR
THOMAS F. HOUGHTON
BY Browne, Schuyler & Beveridge
ATTORNEYS

3,548,294
LOW VOLTAGE DIRECT CURRENT REGULATOR USING COMPLEMENTARY TRANSISTOR PAIR
Thomas F. Houghton, Franklin Lakes, N.J., assignor to Aircraft Radio Corporation, Boonton, N.J., a corporation of New Jersey
Filed Dec. 12, 1967, Ser. No. 689,986
Int. Cl. G05f 1/58
U.S. Cl. 323—4                                    5 Claims

ABSTRACT OF THE DISCLOSURE

Low input regulator for avionic equipment utilizing a complementary transistor pair for current clamping. A germanium PNP transistor is used in the main current leg to minimize regulator voltage drop and the NPN leg of the pair is used for current sensing. Load changes are detected and applied to control the NPN transistor, which in turn controls the PNP transistor such that, within regulation limits, more or less current is supplied to the load as required at the regulation voltage.

---

This invention relates in general to regulator circuits and, more particularly, to low voltage regulator circuits for avionic equipment.

In aviation, electronic equipment is generally supplied from the aircraft direct current supply buses. In such situations it is necessary for a voltage regulator to have the lowest possible internal voltage drop and yet be able to withstand large transients effects and pass moderately high currents. Further, it is required that the regulator be a poor transmission device for hum signals as large as one volt RMS and, if possible, be current limiting for shorts or partial shorts. Moreover, it is important to provide regulation ability with input voltages only slightly greater than the desired regulated output voltage and, at the same time, to provide current overload protection to the regulation transistor without detracing from the ability to regulate input voltages only slightly greater than the desired regulated output voltage. Moreover, it is desirable to maintain the regulated design free of floating supplies, multiple voltage sources and special components such as inductors or transformers.

The object of this invention is to provide a low voltage direct current regulator having a low inherent voltage drop and auxiliary current protection which is of simple and compact design and which satisfies the foregoing requirements.

The features of the invention which are believed to be new and novel are set forth with particularity in the appended claims. The invention may be best understood by reference to the following description when taken in conjunction with the accompanying drawing which shows an embodiment of the low voltage voltage regulator circuit according to the invention.

Referring now to the drawing, there is shown a low voltage regulator circuit in accordance with the invention for regulating the direct current voltage and current applied to a load. In the drawing, the aircraft supply 10 has its positive output terminal connected to terminal 11 of the circuit and common terminal connected to input terminal 11G which is the ground or common. The supply voltage is applied through a fast acting fuse 13 to input terminal 12 of the regulator. Transistor T1 is a PNP transistor having emitter electrode 16, collector electrode 17 and base electrode 18 with its emitter electrode 16 and its collector electrode 17 connected in series with the load 32 by conductor 31. Transistor T2 is a NPN transistor having emitter electrode 20, collector electrode 19 and base electrode 21, with collector electrode 19 being connected directly to base electrode 18 of transistor T1 and emitter electrode 20 connected through current sensing resistor R2 to collector electrode 17 of transistor T1 and the output terminal or bus 31 of the circuit. Resistors R3 and R4 are connected in series with each other and between the common connection of input terminal 12 and emitter electrode 16 of transistor T1 and base electrode 21 of transistor T2. Diode D1 is connected between base electrode 21 of transistor T2 and collector electrode 17 of transistor T1 and the output conductor 31. By-pass capacitor C1 is connected between intermediate point 22 of resistors R3 and R4 and ground terminal or bus 11G. Transistor T3 is an NPN transistor having electrode 27, emitter electrode 28, and base electrode 29 with emitter electrode 28 connected directly to ground and collector electrode 27 connected directly to the base electrode 21 of transistor T2. Base electrode 29 of transistor T3 is connected to intermediate point 30 between Zener diode Z1 and resistor R1 which, in turn are connected across load 32 and output terminal or bus 31 and ground or common. Capacitor C2 is connected in shunt across the output terminals 21 and load circuit or load 32.

Transistor T1 and transistor T2 to a certain extent constitute a complementary pair which allows overload current sensing to take place in the NPN leg constituted by transistor T2. The voltage drop which occurs in the sensing resistor R2 does not in this way subtract from the minimum voltage at which regulation must take place. (For avionic equipment it is desirable to operate with full regulation taking place with as low an input voltage as possible.) Current regulation in this circuit takes place when output variations up to about .4 amp occur. These load changes are reflected as a correction voltage to the base of transistor T3 by Zener diode Z1 and resistor R1. Transistor T3 acts to control the base current of transistor T2 which in turn modifies the base current of transistor T1. The control is such that more or less load current demand is supplied as required.

For input voltage variations the current of transistor T2 and transistor T3 is not affected, such being fixed by the fixed biased established by transistor T3, by the Zener reference Z1 and resistor R1. The control transistor T3 maintains very tight load control of the direct current parameters since it operates at maximum direct current gain, being limited only by its internal resistance.

In order to keep the regulator as compact as possible, a small transistor T1 of highest dissipation properties, is used for carrying of the burden of the load current. For this purpose, it is preferred that transistor T1 be a germanium transistor. Since NPN devices do not yield the low saturation or other interelement voltage drops, a PNP structure with its low inherent drop is important to minimize regulator voltage drop. The bias-current sensing resistor, R2, allows transistor T2 to remain conductive until partial shorts or load curernt demands exceeding 400 ma. obtain. The increased load current demand causes an increased drop across resistor R2. This drop across resistor R2, summed with the VBE of transistor T2 exceeds the clamp (diode D1) voltage drop and removes the bias from transistor T2. As transistor T2 turns off it feeds less base current to transistor T1 and transistor T1 thus moves towards non-conduction. As transistor T1 moves into non-conduction, less voltage is delivered to the load providing a further safety feature.

In the circuit, current clamping is adjusted by resistor R2 to clamp at about 0.7 a. This is done to not exceed the dissipation limits of transistor T1 when high line voltage (greater than 19 v. DC) conditions and shorted output conditions are concurrent.

The circuit affords inherent protection against transients. Positive going transients to 78 v. peak with 100 μsec. durations propagate thru the regulator with only 0.5 v. peak residual observable in the output. Transistor T1 passes the transient thru its base-emitter diode.

However, other elements, transistor T2 and transistor T3 are back biased and propagate only about 0.5 v. transient voltage.

Resistors R3 and R4 maintain a base bias on transistor T2, being part of the collector load for the control transistor T3. Resistor R4 in conjunction with capacitor C2 acts to filter hum signals from being base injected to transistor T2. The low output impedance of the complementary couple (transistors T1 and T2) aids in minimizing hum signals from propagating from the supply lines to the load. Output impedance of the regulator, however, can be made to be lower than the ordinary Darlington-Pass Transistors. However, in this case output impedance is traded-off for current sensing.

The use of germanium NPN–PNP structures for transistors T1 and T2 allow lower saturation and VBE voltages to be obtained than normally would be the case with silicon type transistors. For components values set forth in the table on the drawing, measurements obtained with the regulator show that input voltages as low as 10.8 v. allow output regulation of 10.0 v. Regulation variance is less than 0.3 for input changes of 10.8 to 16 v. DC. The output voltage remains constant within 0.3 v. DC for load current changes from about 0 to .35 a. Hum at the output is about 5 mv. for i.v. of 200 c.p.s. on the input line.

For reserve protection a Zener diode (not shown) may be connected across the input to the regulator.

Temperature characteristics of the regulator are excellent from −55 to +71° C. The output voltage change is only a few tenths of a volt. The output impedance was not very low being in the order of 15 ohms but this is reduced to about 5 ohms with capacitor C2. Furthermore, the circuit output voltage does not exceed 10 v. since it is self-loaded by Zener diode Z1 and resistor R1. In this way, by-pass capacitors on the regulated bus are protected against high voltage if the load is removed.

It is apparent that the invention satisfies the objects thereof in providing a regulator having the ability to regulate with input voltages only slightly greater than the desired regulated output voltage, to provide a current overload protection without sacrificing the low voltage regulation of the circuit, and without degradation of inherent transient or hum reduction characteristic. Further, it is apparent that the circuit is simple and compact and that it eliminates the need for floating supplies, multiple voltage sources and special components such as inductors or transformers.

What is claimed is:

1. A compact low voltage direct current regulator having a low internal voltage drop comprising:
    a first transistor of the PNP type having base, emitter and collector electrodes, said emitter electrode being connected to one terminal of the source of voltage to be regulated and said collector electrode being connected to a load,
    a second transistor of the NPN type having base, collector and emitter electrodes, means connecting the collector electrode of said second transistor to the base electrode of said first transistor, and a bias current sensing resistor connecting said emitter electrode of said second transistor to the collector electrode of said first transistor,
    resistor means connected between the base electrode of said second transistor and the emitter electrode of said first transistor and said one terminal of the source to be regulated,
    a clamp diode connected between the base electrode of said second transistor and said load, whereby when the voltage drop across said bias current sensing resistor added to the VBE drop of said second transistor exceeds the voltage on said clamp diode a control voltage proportional to current supplied to said load is applied to the base of said first transistor to cause said first transistor to deliver less voltage to said load,
    and means connected to the base electrode of said second transistor for controlling the bias voltage in accordance with the voltage across the load.

2. The low voltage regulator defined in claim 1 wherein said means connected to the base electrode of said second transistor includes:
    a Zener diode and resistor connected in series with each other and in shunt across the load,
    a third transistor of the NPN type having base, emitter and collector electrodes, means connecting said collector electrode of said third transistor directly to said base electrode of said second transistor and the emitter electrode of said third transistor to the common terminal of said source, and means connecting the base electrode of said third transistor to the common point between said Zener diode and resistor.

3. The low voltage regulator defined in claim 1 wherein said first transistor is a germanium transistor.

4. The low voltage regulator as defined in claim 2 including a capacitor connected in shunt across the output terminal of the regulator to lower the output impedance of the regulator.

5. A compact aircraft voltage regulator having low internal voltage drop comprising:
    a complementary pair of transistors, each having base, collector and emitter electrodes,
    means connecting the emitter-collector electrodes of a germanium PNP transistor of said pair between a source of unregulated aircraft supply voltage and a load,
    means connecting the base electrode of said PNP transistor to the collector electrode of the NPN transistor of said pair,
    a current overload protection circuit including a bias current sensing resistor connecting the emitter electrode of said NPN transistor to the collector electrode of said PNP transistor so that currents passing therethrough to said load produce a voltage at the emitter electrode of said second transistor proportional thereto, a voltage clamping means connected between the base electrode of said NPN transistor and said load, and resistance means connected between the base electrode of said NPN transistor and said source, whereby when the voltage proportional to load current exceeds a selected level a control voltage is applied to the base electrode of said PNP transistor to cause said PNP transistor to deliver less voltage to said load, and
    reference means for detecting changes in voltage at said load and varying the potential at the base electrode of said NPN transistor proportionately to detect changes to thereby vary the potential on the base electrode of said PNP transistor.

References Cited

UNITED STATES PATENTS

| 2,832,035 | 4/1958 | Bruck et al. | 323—22T |
| 2,963,637 | 12/1960 | Osborn | 323—22T |
| 3,209,205 | 9/1965 | Olson | 317—33 |
| 3,403,320 | 9/1968 | Whitman, Jr. | 323—4 |
| 3,218,542 | 11/1965 | Taylor | 323—22T |

J D MILLER, Primary Examiner

G. GOLDBERG, Assistant Examiner

U.S. Cl. X.R.

307—237, 297; 317—33; 323—9, 22, 38